US009694804B2

(12) United States Patent
Nefcy et al.

(10) Patent No.: US 9,694,804 B2
(45) Date of Patent: Jul. 4, 2017

(54) DELAYING LASH CROSSING FOR A MODULAR HYBRID TRANSMISSION

(71) Applicant: FORD GLOBAL TECHNOLOGIES, LLC, Dearborn, MI (US)

(72) Inventors: Berndard D. Nefcy, Novi, MI (US); Marvin P. Kraska, Dearborn, MI (US); Bradley D. Riedle, Northville, MI (US); Dennis C. Reed, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 131 days.

(21) Appl. No.: 14/226,962

(22) Filed: Mar. 27, 2014

(65) Prior Publication Data

US 2015/0274148 A1   Oct. 1, 2015

(51) Int. Cl.
| | |
|---|---|
| *B60W 10/08* | (2006.01) |
| *B60W 10/06* | (2006.01) |
| *B60W 10/196* | (2012.01) |
| *B60W 10/30* | (2006.01) |
| *B60W 30/188* | (2012.01) |
| *B60W 20/10* | (2016.01) |

(52) U.S. Cl.
CPC ............ *B60W 10/06* (2013.01); *B60W 10/08* (2013.01); *B60W 10/196* (2013.01); *B60W 10/30* (2013.01); *B60W 20/10* (2013.01); *B60W 30/1884* (2013.01); *B60W 2510/06* (2013.01); *B60W 2510/08* (2013.01); *B60W 2510/18* (2013.01); *B60W 2710/065* (2013.01); *B60W 2710/081* (2013.01); *B60W 2710/083* (2013.01); *Y02T 10/6286* (2013.01); *Y10T 477/24* (2015.01)

(58) Field of Classification Search
CPC . B60W 10/06; B60W 10/08; B60W 2510/081
See application file for complete search history.

(56) References Cited

U.S. PATENT DOCUMENTS

| | | | |
|---|---|---|---|
| 6,574,535 B1 * | 6/2003 | Morris ..................... | B60K 6/44 180/65.1 |
| 6,754,573 B2 | 6/2004 | Russell et al. | |
| 7,971,667 B2 | 7/2011 | Yamazaki | |
| 8,046,142 B2 | 10/2011 | Morris et al. | |
| 8,147,377 B2 | 4/2012 | Stoffels et al. | |
| 8,332,111 B2 | 12/2012 | McDonnell et al. | |
| 2007/0213910 A1 * | 9/2007 | Doering .............. | F02D 41/0002 701/54 |
| 2009/0007622 A1 * | 1/2009 | Segura Golorons .. | B30B 15/148 72/444 |
| 2009/0143196 A1 | 6/2009 | Smith et al. | |
| 2013/0296132 A1 * | 11/2013 | Doering ................... | B60K 6/48 477/86 |
| 2013/0297105 A1 * | 11/2013 | Yamazaki ................ | B60K 6/48 701/22 |

* cited by examiner

*Primary Examiner* — Stacey Fluhart
(74) *Attorney, Agent, or Firm* — David B. Kelly; MacMillan, Sobanski & Todd, LLC

(57) ABSTRACT

A method of controlling lash crossing in a hybrid electric automotive powertrain. During deceleration while the powertrain is operating in electric only mode, an input is slowed to a first speed lower than an idle speed of an internal combustion engine. Lash crossing is delayed until the input has slowed to the first speed. When the first speed is zero, lash crossing is delayed until receipt of an acceleration request.

14 Claims, 3 Drawing Sheets

_US 9,694,804 B2_

DELAYING LASH CROSSING FOR A MODULAR HYBRID TRANSMISSION

BACKGROUND OF INVENTION

The present invention relates to controlling powertrain lash crossing and in particular to controlling lash crossing for a modular hybrid transmission.

Lash crossing of a powertrain is when the powertrain transitions between producing a positive torque and receiving a negative torque. At a zero torque transition point between the positive and negative torques the powertrain produces lash when powertrain components, including transmission gears, separate when torque is removed at the transition point before the components resume contact when torque is reapplied. Lash may produce a clunk noise or bump that is perceivable to a vehicle occupant. Lash contributes to noise, vibration, and harshness that degrades driveability of a vehicle using the powertrain.

Timing of lash crossing is controllable by a powertrain control system. During deceleration of the vehicle using a conventional powertrain, the lash crossing is controlled to occur when a driveshaft in the powertrain has slowed to an idle speed of an internal combustion engine (approximately 750 RPM). Were the driveshaft allowed to slow below the idle speed, the engine would stall. Additionally, the vehicle typically has hydraulic systems powered by the engine. The hydraulic systems have been designed to operate with a minimum operating speed equal to the idle speed because, due to stalling, the conventional powertrain does not operate below the idle speed.

Alternatively, the vehicle may use a hybrid powertrain. Typically, for the hybrid powertrain operating in an electric only mode, lash crossing is controlled to occur when the driveshaft has slowed to the idle speed of the engine in the conventional powertrain even though an electric machine in the hybrid powertrain does not have a stall limitation. By lash crossing the machine at the idle speed, hydraulic systems designed for use with the conventional powertrain can be used with the hybrid powertrain as well. Lash crossing for a hybrid powertrain continues to be at the idle speed of the engine despite the availability of hydraulic systems designed to have minimum operating speeds lower than the idle speed.

However, lash crossing the hybrid powertrain at the engine idle speed may reduce powertrain efficiency. Lash crossing the hybrid powertrain at the idle speed entails the electric machine being operated at the idle speed, which may deplete an electrical power source. A regenerative braking capacity may also be reduced.

SUMMARY OF INVENTION

An embodiment contemplates a method of managing an automotive powertrain. An input connected to an unpowered electric machine in an automotive powertrain is rotated to produce a first torque in the machine. A first speed for the input is determined. Regenerative braking is used to slow the input below an idle speed to the first speed. When the first speed is reached, the machine is powered to produce a second torque, opposite the first torque, and lash cross the input. Upon an acceleration request, the powered machine is accelerated from the first speed to the idle speed.

Another embodiment contemplates a method of managing an automotive powertrain. A desired input speed, below an idle speed, is determined for an automotive powertrain. An input, rotating to produce a first torque in an unpowered electric machine, is slowed to the desired speed. The input is lash crossed upon reaching the desired speed and the unpowered machine powered to produce a second torque, opposite the first torque. The powered machine is operated at the desired speed.

Another embodiment contemplates a method of managing an automotive powertrain. An automotive powertrain battery is charged by rotating an input to produce a first torque in an unpowered electric machine. Rotation of the input is slowed below an idle speed to a target speed. Delaying, until the target speed is reached, powering the machine to produce a second torque, opposite the first torque, and lash crossing the input. The machine is operated at the target speed.

An advantage of an embodiment is that increased regenerative braking capacity and decreased battery depletion conserves energy. This may improve efficiency of the hybrid powertrain.

DETAILED DESCRIPTION

Figure 1:
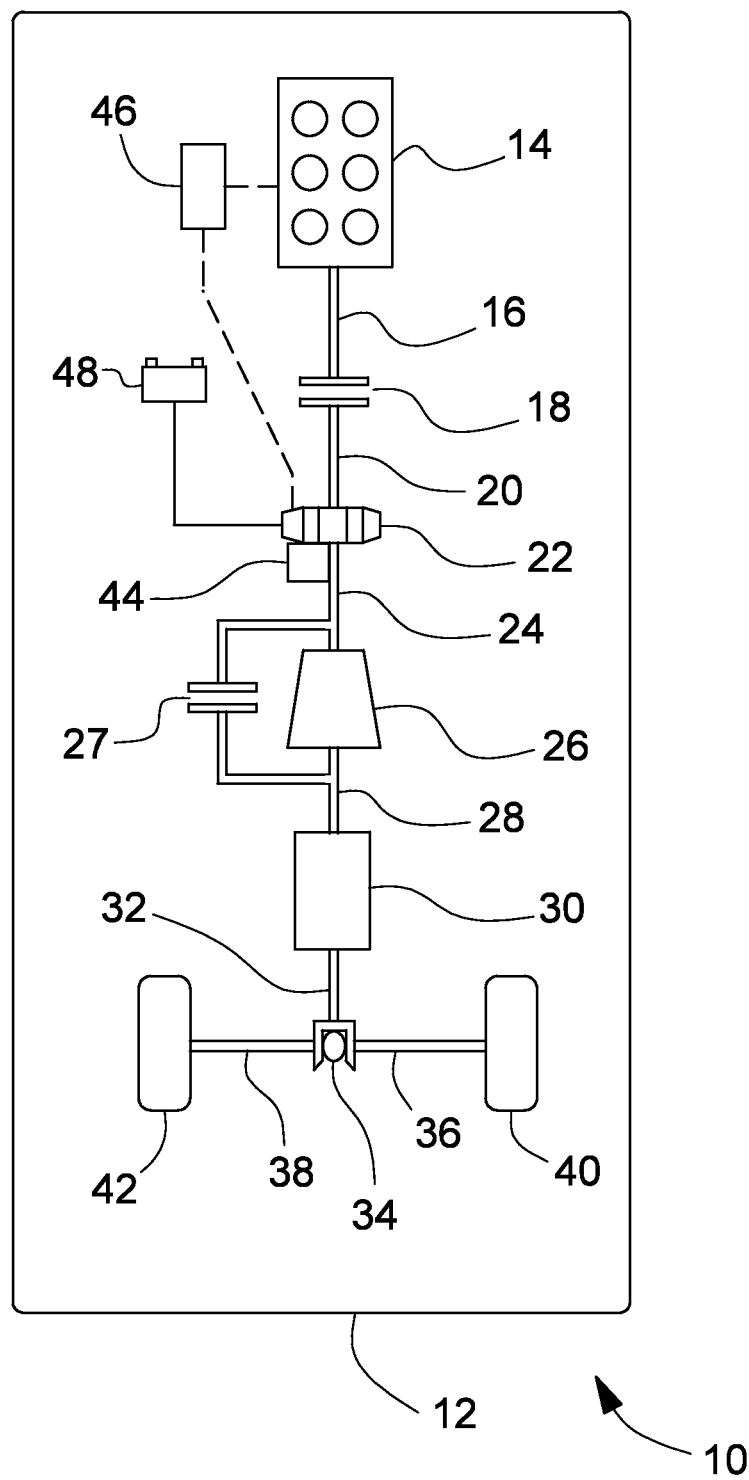
FIG. 1 is a schematic view of a hybrid electric powertrain.

FIG. 1 schematically illustrates a hybrid electric powertrain 10 for an automotive vehicle 12. This powertrain 10 is merely exemplary, and may take other forms, which may be front wheel drive, rear wheel drive, and all wheel drive types of powertrains.

The powertrain 10 includes an internal combustion engine 14 powering a crankshaft 16. Interposed between the engine 14 and an electric machine 22, which may be an electric traction motor or motor/generator, is a clutch 18. When engaged, the clutch 18 connects the crankshaft 16 with an electric machine input 20 and transmits torque between the engine 14 and the machine 22. In turn, the machine 22 transmits torque, in addition with the engine 14 if the clutch 18 is engaged, to a torque converter 26 through a torque converter input 24 and the torque converter 26 transmits torque to a transmission 30 through a transmission input 28. The torque converter 26 includes a lockup clutch 27 to directly couple the torque converter input 24 and the transmission input 28. The transmission 30 turns a driveshaft 32 which in turn drives a differential 34. The differential 34 transmits torque to first and second axles 36 and 38, respectively, which drive first and second wheels 40 and 42, respectively. A main transmission pump 44 is driven by the torque converter input 24. Lash crossing is controlled by a powertrain controller 46 that controls operation of the machine 22 and/or, if the clutch 18 is engaged, the engine 14. The term "lash crossing" as used herein means a controlled event completed without gear clunk (as known to one skilled in the art) or other issues noticeable to a driver of the vehicle 12. The machine 22 is electrically connected to a battery 48.

Figure 2:
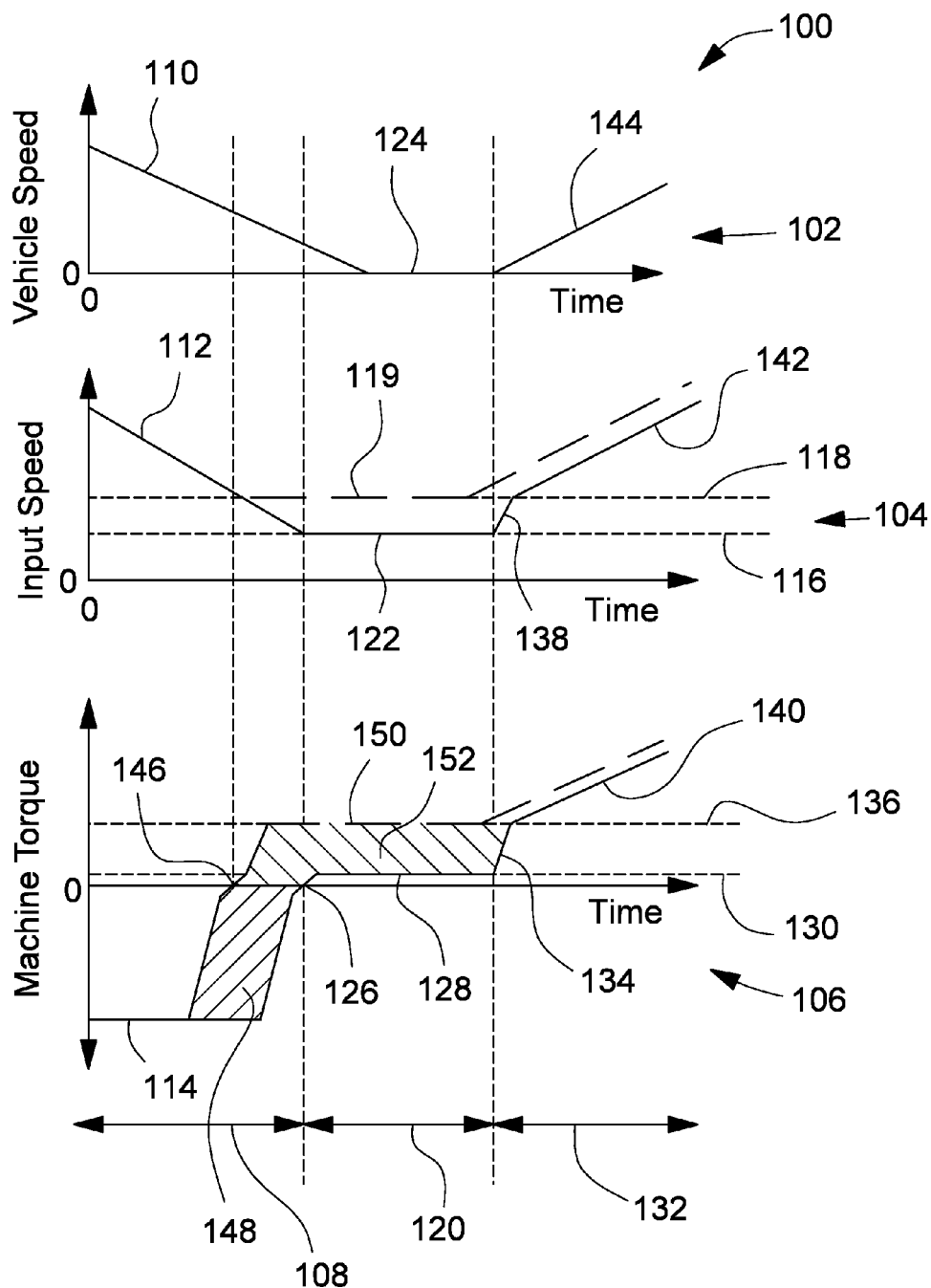
FIG. 2 is a graph of vehicle speed, input shaft speed, and electric machine torque.

FIG. 2 will now be discussed with reference to FIG. 1. FIG. 2 graphically illustrates a vehicle speed 102, an input speed 104, and a machine torque 106 during a lash crossing control routine 100. During the lash crossing control routine 100, the clutch 18 is disengaged so that the vehicle 12 is operating in an electric only mode.

During a time period 108 the vehicle 12 is slowing in preparation for stopping. The vehicle 12 has a decreasing speed 110, the input 28 has a decreasing rotational speed 112, and the machine 22 has a negative torque 114. The machine 22 is unpowered so that rotation of the input 28 by the negative torque 114 turns the machine 22 and produces a regenerative braking charge stored in the battery 48. When unpowered, the machine 22 is being driven by the first and second wheels 40 and 42, respectively, or is generating the regenerative braking charge. When powered, the machine 22 is driving the first and second wheels 40 and 42, respectively.

During the time period 108, the controller 46 determines a minimum speed 116 for the input 28. The minimum speed 116 is less than an idle speed 118. The idle speed 118 is a minimum operating speed at which the internal combustion engine 14 operates. Below the idle speed 118, the engine 14 will stall if the clutch 18 is engaged. The minimum speed 116 is the minimum speed at which the powertrain 10 may operate for the vehicle 12. The minimum speed 116 is between the idle speed 118 and a zero speed, and can be predetermined for the powertrain 10. For example, the minimum speed 116 may be a speed needed to operate the pump 44. Alternatively, the minimum speed 116 may be varied as the vehicle 12 slows or after the vehicle 12 has stopped. The minimum speed 116 may be varied as the demands on the powertrain 10, by the other non-propulsive systems in the vehicle 12, vary.

During a time period 120 the vehicle 12 slows and arrives at a stop. The input 28 rotates at a speed 122 equal to the minimum speed 116. At the same time, the speed 110 of the vehicle 12 has decreased to a zero speed 124. When the input 28 slows to the minimum speed 116, the controller 46 lash crosses the transmission 30 at a time point 126. Torque of the machine 22 transitions at the time point 126 from negative to positive. The lash crossing is by a method known to one skilled in the art, e.g., as disclosed in U.S. Pat. No. 6,754,573 titled "Vehicle and Engine Control System and Method," which is incorporated herein by reference in its entirety. After the lash crossing at the time point 126, the machine 22 is producing a positive torque 128. The positive torque 128 is equal to a minimum torque amount 130. The minimum torque amount 130 is the amount of torque needed for the machine 22 to rotate the input 28 at the minimum speed 116. The battery 48 supplies an electrical charge to power the machine 22 to rotate at the minimum speed 116.

During a time period 132 the vehicle 12 resumes motion upon receipt of an acceleration request. The machine 22 is powered to increase a torque 134 to an idle torque 136. The torque 134 increases a speed 138 of the input 28. The machine then increases torque to ramping up torque 140 to rotate the input 28 at an increasing speed 142. The combined effect of the torques 134 and 140 and the input speeds 138 and 142 results in an increasing speed 144 of the vehicle.

Delaying lash crossing by lowering the minimum speed 116 below the idle speed 118 improves efficiency of the powertrain 10 by increasing regenerative braking potential and decreasing electrical power depletion. Conventional lash crossing takes place at a time point 146, thereby losing a regenerative braking capacity 148. Following the conventional lash crossing at the time point 146, the input 28 rotates at a speed 119 equal to the idle speed 118, which entails the machine 22 operating at a positive torque 150. The positive torque 150 is equal to the idle torque 136. Operation of the machine 22 at the positive torque 150 depletes an electrical power source by an amount 152. Delaying lash crossing to the time point 126 preserves the regenerative braking capacity 148 and prevents depletion of the electrical power source by the amount 152.

Where the acceleration request is received prior to delayed lash crossing at the time point 126, the controller 46 lash crosses the transmission 30 at a time point prior to the time point 126. Torque of the machine 22 and speed of the input 28 are increased to the idle torque 136 and idle speed 118, respectively, before increasing at the torque 140 and speed 142, respectively.

Where the acceleration request is received during the time period 108, lash crossing takes place prior to the input speed 122 being reached.

Figure 3:
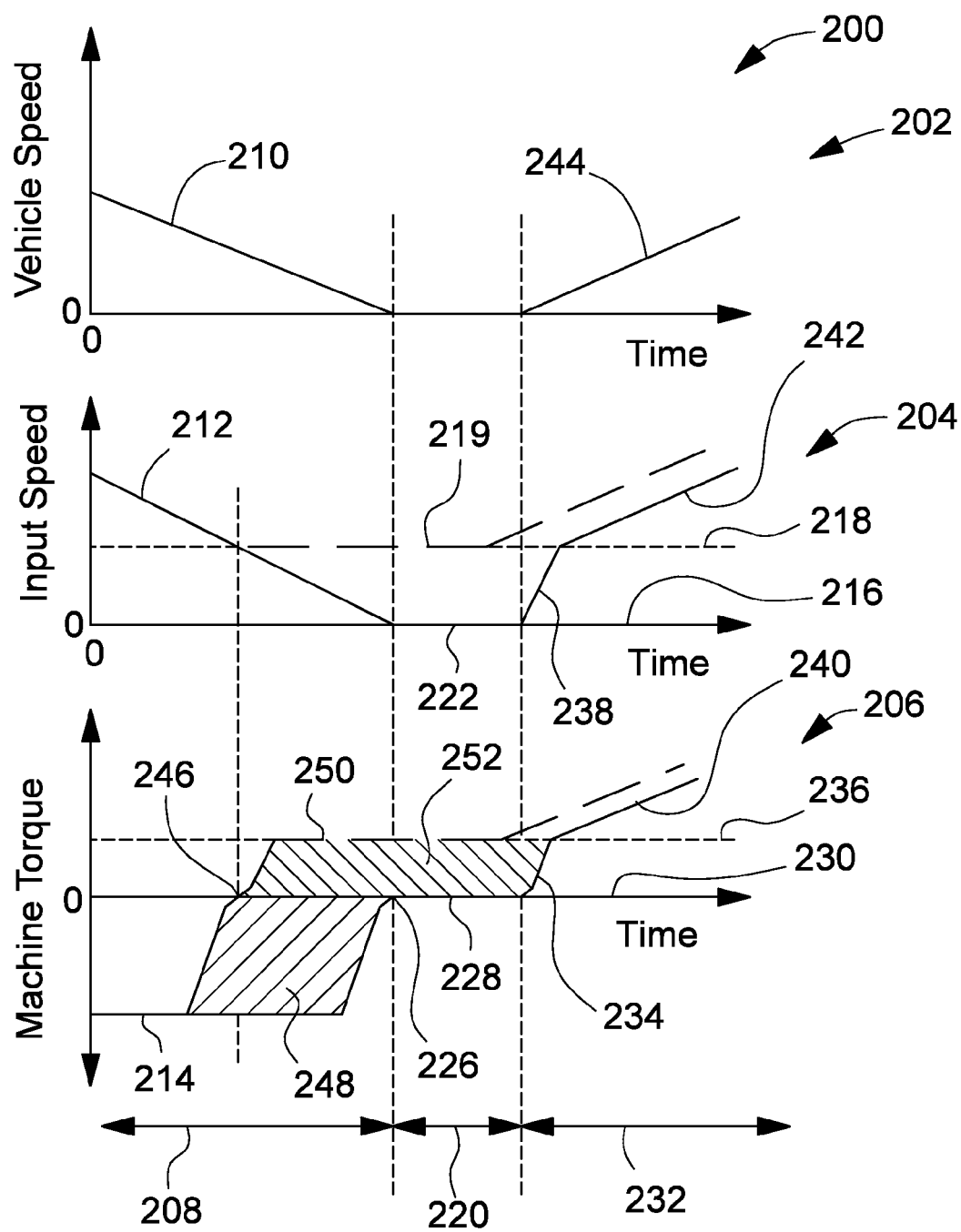
FIG. 3 is a graph of vehicle speed, input shaft speed, and electric machine torque, similar to FIG. 2 but showing a zero shaft speed.

Referring now to FIG. 3, there is illustrated a lash crossing routine 200, which is similar to the lash crossing routine 100 but wherein the minimum speed 216 is zero. As FIG. 3 is a specific case of the lash crossing routine illustrated in FIG. 3, like reference numerals designate corresponding parts in the drawings (but with 200 series element numbers) and detailed description thereof will be omitted. Prior to the input speed slowing below an idle speed 218, the controller 46 has determined that a minimum speed 216 is zero. During a time period 220, an input speed 222 is zero, equal to the minimum speed 216 of zero. Also during the time period 220 a torque 228 of the machine is zero at a minimum torque 230. The minimum speed 216 of zero maximizes efficiency of the powertrain 10 by delaying lash crossing when compared to conventional lash crossing at a time point 246. A regenerative braking capacity of 248 is available and an electrical amount 252 is not used compared to conventional lash crossing.

While certain embodiments of the present invention have been described in detail, those familiar with the art to which this invention relates will recognize various alternative designs and embodiments for practicing the invention as defined by the following claims.

The invention claimed is:

1. A method of controlling an electrified vehicle powertrain comprising:
producing a first torque in an unpowered electric machine by rotating a machine input, causing regenerative braking to slow the input below an engine idle speed to a non-zero target speed;
powering the machine at the target speed to produce a second torque, opposite the first torque, and lash cross the input;
maintaining the target speed below the idle speed until receiving a torque request.

2. The method of claim 1 wherein the machine receiving the first torque charges a battery and the machine producing the second torque discharges the battery.

3. The method of claim 1 wherein the target speed is a minimum speed to power a transmission pump.

4. The method of claim 1 wherein the input is disengaged from an engine in the powertrain.

5. The method of claim 1 wherein, prior to the target speed being reached, powering the machine to produce the second torque and lash crossing the input based upon an acceleration request.

6. The method of claim 1 comprising:
maintaining the input below the engine idle speed.

7. A method of controlling an electrified vehicle powertrain comprising:
charging a battery by rotating an input, producing a first torque in an unpowered electric machine;
slowing rotation of the input below an engine idle speed to a target speed;

delaying, until the target speed is reached, powering the machine to produce a second torque, opposite the first torque, and lash crossing the input;

operating the machine at the target speed until receiving a torque request.

8. The method of claim 7 wherein charging of the battery is increased by delaying lash crossing.

9. The method of claim 7 wherein discharging of the battery is decreased by delaying lash crossing.

10. The method of claim 7 wherein the target speed is a minimum speed to power a transmission pump.

11. The method of claim 10 further comprising the step of delaying acceleration of the input from the target speed to the idle speed until the torque request is made.

12. The method of claim 7 wherein the target speed is zero and the machine is not powered to maintain the target speed before the input is lash crossed.

13. The method of claim 7 further comprising:
stopping delaying powering the machine;
powering the machine to produce the second torque and lash crossing the input based upon an acceleration request.

14. A method of controlling an electrified vehicle powertrain comprising:

charging a battery of an automotive powertrain by rotating an input to produce a first torque in an unpowered electric machine;

slowing rotation of the input below an engine idle speed to a target speed;

delaying, until the target speed is reached, powering the machine to produce a second torque, opposite the first torque, and lash crossing the input;

operating the machine at the target speed;

delaying acceleration of the input from the target speed to the idle speed until a torque request is made.

\* \* \* \* \*